United States Patent
Alaimo et al.

(10) Patent No.: US 7,533,323 B2
(45) Date of Patent: May 12, 2009

(54) ADAPTIVE ARCHIVAL FORMAT

(75) Inventors: S. Christopher Alaimo, Boulder, CO (US); Matthew D. Bondurant, Superior, CO (US); James D. Jones, Niwot, CO (US); Christopher Mayne, Boulder, CO (US); Robert Sugar, Boulder, CO (US)

(73) Assignee: Prostor Systems, Inc., Boulder, CO (US)

( * ) Notice: Subject to any disclaimer, the term of this patent is extended or adjusted under 35 U.S.C. 154(b) by 385 days.

(21) Appl. No.: 11/194,137

(22) Filed: Jul. 28, 2005

(65) Prior Publication Data

US 2007/0038915 A1 Feb. 15, 2007

(51) Int. Cl.
*G11C 29/00* (2006.01)
(52) U.S. Cl. .................. 714/768; 714/766; 714/770
(58) Field of Classification Search .......... 714/768, 714/776, 762, 770, 766, 769; 711/118, 115
See application file for complete search history.

(56) References Cited

U.S. PATENT DOCUMENTS

| | | | |
|---|---|---|---|
| 5,630,093 A * | 5/1997 | Holzhammer et al. ....... 711/115 |
| 6,128,698 A | 10/2000 | Georgis | |
| 6,389,503 B1 | 5/2002 | Georgis et al. | |
| 6,438,084 B2 * | 8/2002 | Kawashima et al. ..... 369/53.22 |
| 6,611,394 B1 | 8/2003 | Kato et al. | |
| 6,618,795 B2 | 9/2003 | Chan et al. | |
| 6,674,596 B1 | 1/2004 | Takayama | |
| 6,717,762 B1 | 4/2004 | Bauck et al. | |
| 6,717,769 B2 | 4/2004 | Staley et al. | |
| 6,738,946 B1 * | 5/2004 | Irvin ........................ 714/776 |
| 7,096,405 B2 * | 8/2006 | Kurobe et al. .............. 714/762 |
| 7,281,091 B2 * | 10/2007 | Yamazaki ................... 711/118 |
| 2005/0114726 A1 * | 5/2005 | Ouchi ........................... 714/5 |

OTHER PUBLICATIONS

"What Is iVDR?," printout from website http://www.ivdr.org/iVDR/ivdr_e.html, 2 pages, printout date: May 27, 2004.

* cited by examiner

*Primary Examiner*—Esaw T Abraham
*Assistant Examiner*—Fritz Alphonse
(74) *Attorney, Agent, or Firm*—Townsend and Townsend and Crew LLP

(57) ABSTRACT

Data are stored on a random-access storage medium. A user set of data is received. The user set of data is mapped to multiple frames. For each frame, error-correction bytes are generated over the data mapped to that frame. In addition, the data mapped to that frame are written to a number of data blocks of that frame and the error-correction bytes generated for that frame are written to a number of error-correction blocks of that frame. At least one of the number of error-correction blocks and the number of data blocks differs among at least some of the frames.

25 Claims, 5 Drawing Sheets

ADAPTIVE ARCHIVAL FORMAT

BACKGROUND OF THE INVENTION

This application relates generally to data storage. More specifically, this application relates to removable-cartridge data-storage devices.

Computer backup has traditionally been performed using tape-drive technologies. This has been true for a number of different reasons, one of which is the fact that tape media have traditionally provided the lowest cost per bit of storage. In addition, tape devices had the advantage that they used removable tape cartridges, which may be taken to an off-site location for disaster recovery. This traditional emphasis on tape-based storage technologies has resulted in a significant installed base of hardware and system software for accommodating these technologies. For instance, a current trend uses mechanical automation systems, such as tape-cartridge autoloaders and tape libraries holding multiple removable tape cartridges, with multiple tape drives being embedded inside a storage area.

More recently, increased attention has been focused on magnetic hard disk drives ("HDDs") as a possible alternative to tape-based systems. This attention has been prompted by a steady decline in the cost of disk-based storage concomitant with increases in its storage capacity and performance, making it increasingly competitive with tape. But accommodating the existing installed configurations for handling tape-based systems remains a challenge given the different storage techniques used by the different media. For instance, because tape drives are sequential-access devices, new disk-based systems designed for backup applications that cannot emulate tape drives by implementing a sequential-access command protocol are likely to fail.

Both tape drives and disk systems also implement some type of error correction coding ("ECC") to reduce the risk of data loss. Current tape drives implementing sophisticated multilevel ECC algorithms specify uncorrectable error rates on the order of 1 error in $10^{17}$ bits read. Disk drives currently have more limited ECC designs and typically specify uncorrectable error rates on the order of 1 error in $10^{14}$ bits read. A common feature of these systems, however, is the inflexible way that error correction is handled. Formats are typically used that provide error-correction capabilities based on average or worst-case scenarios, fixing the error-correction capability in the format. Such formats are thus unable to easily accommodate differences in environmental factors, or even differences in error-rate requirements for different applications. This uniformity thus sometimes results in undesirably limited error-correction capability for some applications while at the same time resulting in excessive (and therefore inefficient) error-correction capability for other applications.

There is accordingly a general need in the art for methods and systems that provide error correction without such deficiencies. This need is especially acute in disk systems that apply tape emulation.

BRIEF SUMMARY OF THE INVENTION

Embodiments of the invention are directed to methods and systems of storing data on a random-access storage medium. In a first set of embodiments, a method is provided for storing data on a random-access storage medium. A user set of data is received. The user set of data is mapped to a plurality of frames. For each frame, error-correction bytes are generated over the data mapped to that frame. In addition, the data mapped to that frame are written to a number of data blocks comprised by that frame and the error-correction bytes generated for that frame are written to a number of error-correction blocks comprised by that frame. At least one of the number of error-correction blocks and the number of data blocks differs among at least some of the frames.

There are various ways in which the number of error-correction blocks may be determined in different embodiments. For instance, in one embodiment, the number of error-correction blocks comprised by at least one of the frames is determined from an evaluation of environmental conditions for the random-access storage medium. The environmental conditions may comprise bit-error-rate information returned from the storage medium, spin-up time of the storage medium, temperature of an environment where the storage medium is to reside, age of the storage medium, and/or diagnostic information retrieved from the storage medium in different embodiments. In still another embodiment, an archival sense field is written to the random-access storage medium. The archival sense field comprises a pattern of data sensitive to data degradation. The archival sense field is read from the random-access storage medium to evaluate a data-reliability indicator. The number of error-correction blocks comprised by at least one of the frames is then determined from the evaluation of the data-reliability indicator. One example of a data-reliability indicator comprises a bit error rate.

Embodiments of the invention may also conveniently use default information provided on the random-access storage medium. For example, in one embodiment, a default number of error-correction blocks is read from the random-access storage medium. The number of error-correction blocks comprised by at least one of the frames is determined by modifying the default number of error-correction blocks in accordance with an evaluation of environmental conditions for the random-access storage medium. In another embodiment, the default information is used in combination with the archival sense field. For example, in a particular embodiment, a default number of error-correction blocks is read from the random-access storage medium. An archival sense field is written to the random-access storage medium and read to evaluate a data-reliability indicator. The number of error-correction blocks comprised by at least one of the frames is determined by modifying the default number of error-correction blocks in accordance with the evaluation of the data-reliability indicator.

The random-access storage medium may comprise a hard disk drive. In addition, the user set of data may be received from a sequential-access emulation system controller adapted to interface with a host computer using a set of commands applicable to a sequential-access storage device. For instance, the sequential-access storage device may comprise a tape drive. In another embodiment, the user set of data is received from a random-access emulation system controller adapted to interface with a host computer using a set of commands applicable to a random-access storage device. In certain embodiments, at least some of the frames may be interleaved.

In a second set of embodiments, a method is also provided of storing data on a random-access storage medium. A user set of data to be written to the random-access storage medium in a plurality of frames is received. Each frame has a number of data blocks assigned to store data and a number of error-correction blocks assigned to hold error-correction bytes generated for the data stored in the data blocks of that frame. A default specification of the number of data blocks and the number of error-correction blocks is read from the random-access storage medium. The data are written to the plurality of frames, with the error-correction bytes being generated for each frame and written to the plurality of frames. The number of data blocks and the number of error-correction blocks for each of the frames is determined from the default specification.

The number of data blocks and the number of error-correction blocks for at least one of the frames may be determined by modifying the default specification in accordance with an evaluation of environmental conditions for the random-access storage medium. In another embodiment, an archival sense field is written to the random-access storage medium. The archival sense field comprises a data pattern sensitive to data degradation. The archival sense field is read from the random-access storage medium to evaluate a data-reliability indicator. The number of data blocks and the number of error-correction blocks for at least one of the frames are determined by modifying the default specification in accordance with the evaluation of the data-reliability indicator. One example of a data-reliability indicator is a bit error rate.

The user set of data may be received from a sequential-access emulation system controller adapted to interface with a host computer using a set of commands applicable to a sequential-access storage device. Alternatively, the user set of data may be received from a random-access emulation system controller adapted to interface with a host computer using a set of commands applicable to a random-access storage device.

In a third set of embodiments, a random-access computer-readable storage medium is provided. Data are stored in a plurality of frames. Each frame has a number of data blocks assigned to store data and a number of error-correction blocks assigned to hold error-correction bytes generated for the data stored in the data blocks of that frame. At least one of the number of error-correction blocks and the number of data blocks differs for at least some of the frames.

In some such embodiments, the random-access computer-readable storage medium further comprises an archival sense field, which comprises a data pattern sensitive to data degradation.

The plurality of frames may be stored in a substantially contiguous user-data area, with the random-access computer-readable storage medium further comprising a substantially contiguous data-descriptor area storing data delineators. In some cases, the data-descriptor area further stores information that describes a format of the user-data area. This information may be structured for use by a sequential-access emulation system controller to perform sequential-access functions on the random-access computer-readable storage medium. In some embodiments, the storage medium also comprises a media-descriptor area that stores information describing a format of the data-descriptor area. The information stored in the media-descriptor area may have been stored at a time of manufacture of the random-access computer-readable storage medium. In a particular embodiment, the information stored in the media-descriptor area comprises a default specification of the number of data blocks and the number of error-correction blocks for the frames. A free area may exist between the user-data area and the data-descriptor area, and may be used to expand the size of the user-data area or the data-descriptor area while maintaining the user-data area and the data-descriptor area as substantially contiguous areas.

Methods of the invention may be embodied in a data storage system comprising a random-access storage medium and an emulation system controller. The emulation system controller is coupled with the random-access storage medium and adapted to interface with a host computer. The emulation system controller has programming instructions to write a set of user data to the random-access storage medium in accordance with the descriptions above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

1. Sequential-Access Emulation

Embodiments of the invention provide methods and systems that permit data to be organized on a storage medium that records data using fixed-size data blocks, such as on an HDD. Such formatting advantageously organizes the data in a manner that emulates a sequential access format, such as is used by a tape drive, permitting data to be stored on a non-sequential-access device that emulates a sequential-access device. As is understood by those of skill in the art, sequential-access devices both record and read data in a linear sequence. For example, the data format on a tape is typically created on-the-fly as the data are recorded so that there is no fixed relationship between a physical location of the tape and the data stored on the tape. New data are appended to the end of previously recorded data and re-recording a tape from the beginning destroys any previously recorded data on the tape.

This is in contrast to random-access devices, such as HDDs, which have a magnetic disk surface preformatted into fixed-sized sectors at the time of manufacture, with each sector having an address that allows its random access by an interface protocol. Each sector may be written to or read from without impacting other sectors. Sequential-access and random-access devices consequently use different computer interface protocols. Merely by way of example, commonly used tape interfaces include the SCSI Stream Command ("SSC") set and the Advanced Technology Attachment Packet Interface ("ATAPI"), while commonly used disk interfaces include Advanced Technology Attachment ("ATA") or the SCSI Block Command ("SBC") set.

Figure 1:
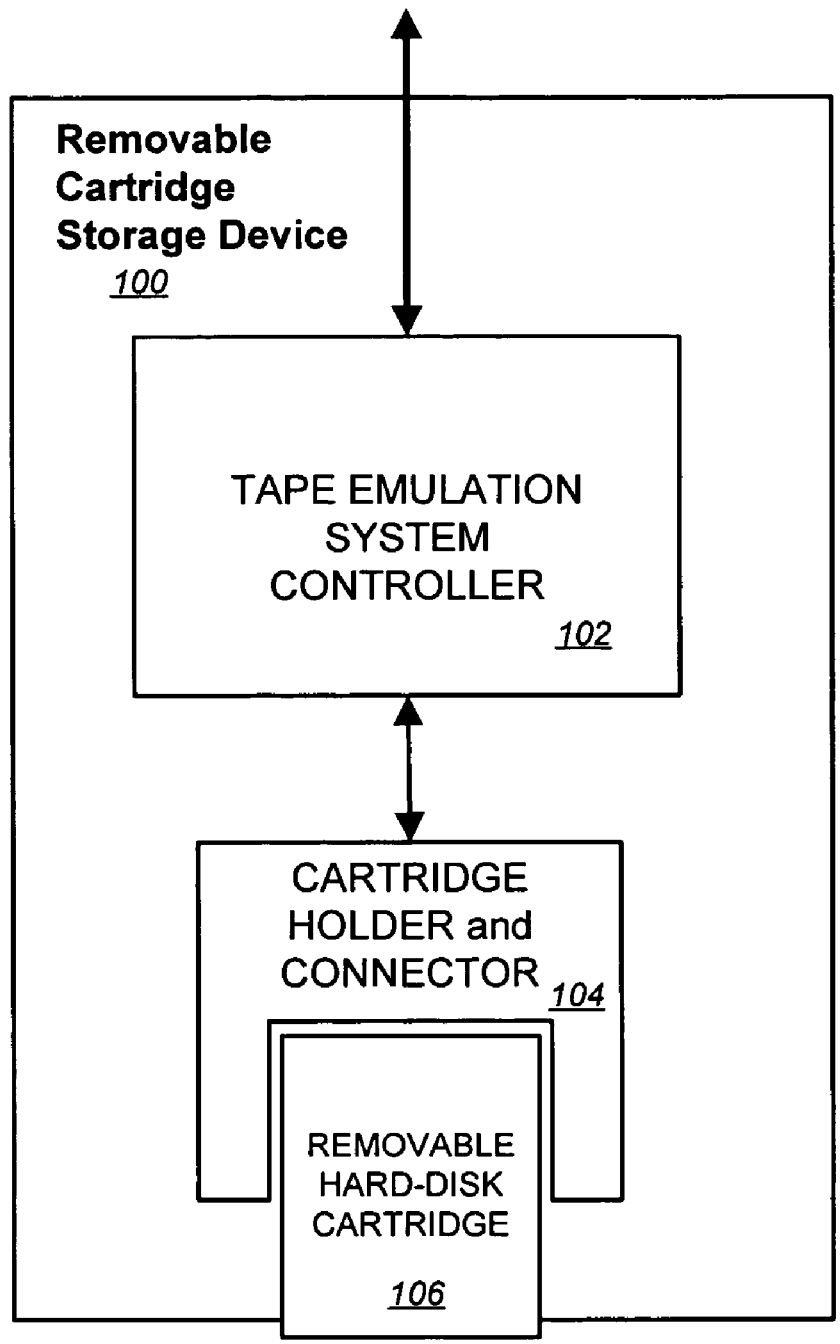
FIG. 1 is a schematic illustration of a removable-cartridge storage device used in some embodiments of the invention.

The differences in such sequential-access and random-access protocols are accommodated in embodiments of the invention by using a removable disk drive, one example of which is illustrated in FIG. 1. In this embodiment, a random-access storage medium is housed in a cartridge 106, shown in the example of FIG. 1 to be a hard-disk cartridge that houses a disk drive. The random-access storage medium is housed in a removable shell that is coupled with a sequential-access emulation system controller 102 through a cartridge holder and connector 104. In the example of FIG. 1, the sequential-access emulation system controller 102 is shown as a tape-emulation system controller. One function of the sequential-access emulation system controller 102 is to convert between sequential-access and random-access protocols. The combination of elements provides a storage device 100 that appears to a host computer (not shown) interfaced with the sequential-access emulation system controller 102 as a sequential-access device, while enabling benefits of the random-access device housed by the cartridge 106 to be exploited.

Figure 2:
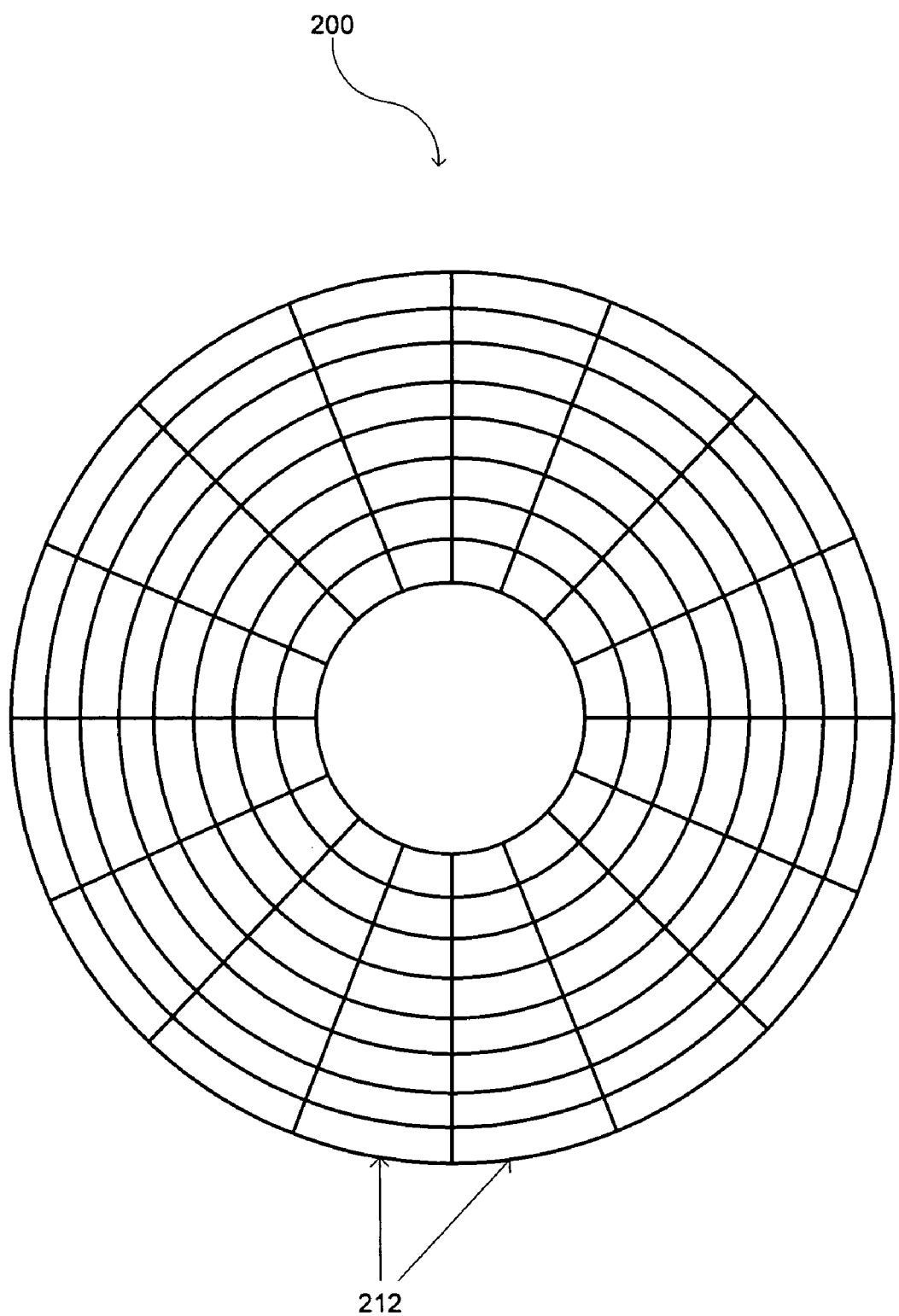
FIG. 2 is a schematic illustration of tracks and sectors on an HDD surface.

As an example of a random-access medium such as may be housed within the cartridge 106, FIG. 2 illustrates the general structure of a preformatted HDD. The HDD is preformatted at the time of manufacture with a 512-byte sector-based format such as may be contained in concentric tracks. Sectors 212 on the disk 200 also have a physical block address ("PBA") and a logical block address ("LBA"). The PBA is the physical location of a sector on the magnetic-disk surface while the LBA is the address used to refer to a sector, providing the addressing mechanism available at the HDD interface. It is possible for an HDD to have PBAs that do not have corresponding LBAs, and which are therefore not normally accessible from the HDD interface. The sequential-access emulation system controller generally operates by accessing LBAs in implementing embodiments of the invention.

The use of sequential-access emulation with a random-access device permits a number of advantages that derive from each type of access. For instance, the sequential-access emulation permits user data records of any size to be stored, with the records sometimes being conveniently numbered in the order of transmission from a host system. Data delineators, such as filemarks, setmarks, and partition markers, may similarly be numbered in the order of transmission from the host system. Other features common to sequential-access formats include the ability to append user data or delineators after any user data record or delineator, the ability to store compressed or encrypted user data, the ability to locate any data record or delineator with its assigned number, the ability to locate an end-of-data last object recorded on the medium, the ability to read content sequentially and determine the type and size of each data record or delineator as part of a self-describing format, and the like. Features that are related to emulating sequential access with random-access media include the ability to store objects of arbitrary size on a storage medium that records data using fixed blocks and the ability to increase data reliability of the storage medium via error correction. As discussed in detail below, embodiments of the invention enhance such error-correction capabilities.

2. Error Correction

Figure 3:
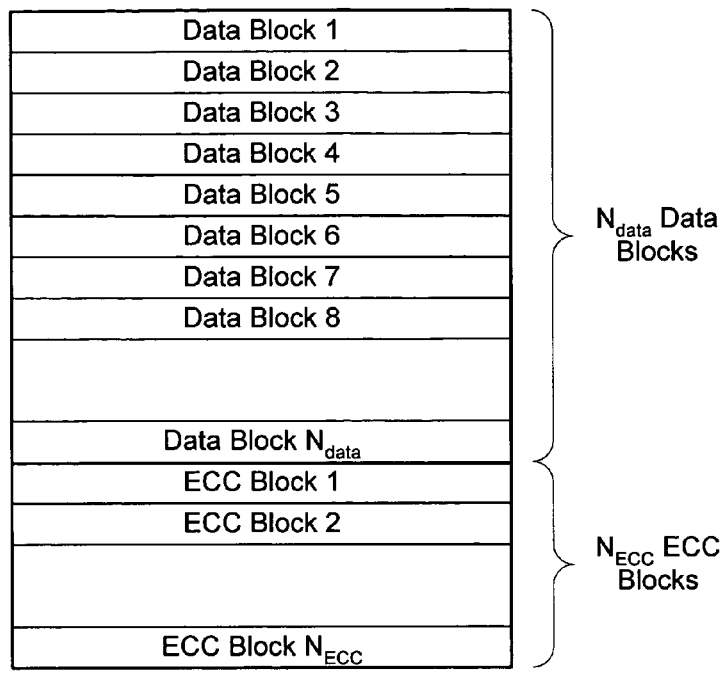
FIG. 3 provides an illustration of a fixed frame and ECC structure used in writing to an HDD.

Data are stored on the random-access medium in frames, each of which generally comprises multiple of the randomly accessible sectors. The frames themselves comprise "data blocks" where user data are stored and comprise "ECC blocks" where error-correction characters are stored according to an error correction protocol being used. The general structure of a frame is shown in FIG. 3, with the number of data and ECC sectors respectively being denoted by $N_{data}$ and $N_{ECC}$. The error correction protocol applies a mathematical algorithm to the set of user data, usually implemented by the sequential-access emulation system controller 102, that permits recovery of corrupted data. That is, if data from the data sectors cannot be read from the storage medium, the sequential-access emulation system controller 102 may reproduce the missing information from the error-correction characters. The number of data blocks that may be recovered depends on the algorithm used, the number of ECC blocks, and on the ratio of error correction blocks to data blocks. In general, the higher the ratio, the greater the number of blocks that may be recovered from the ECC data.

Figure 4:
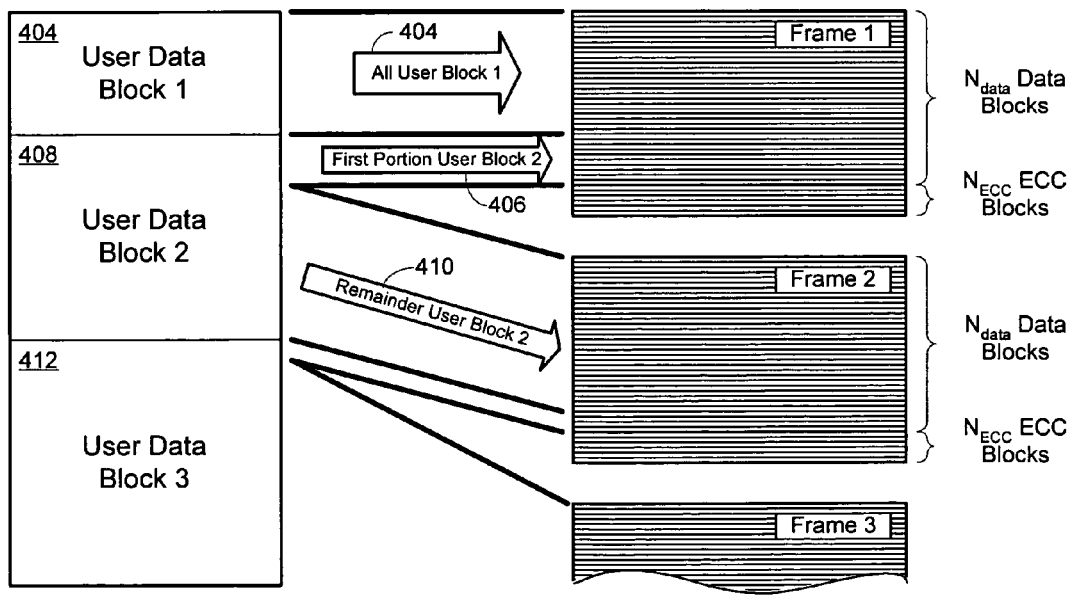
FIG. 4 illustrates a mapping of user data to the HDD when using the fixed frame and ECC structure illustrated in FIG. 3.

When the size of the frame is fixed, having a predetermined total number of blocks divided among a predetermined number of data blocks and ECC blocks, mapping of user data to frames on the HDD may proceed as illustrated in FIG. 4. In particular, user data are generally not provided in sizes that correspond to the frame size, so that when data are written to the disk they are written in sizes that correspond to the number of data sectors in each frame, with ECC characters being calculated for that frame and written in the ECC sectors. This is illustrated in the drawing by showing user data provided in blocks 404, 408, 412, . . . shown on the left of the diagram, with the disk having sectors structured with frames as shown on the right of the diagram.

In this illustration, the first user data block 404 is smaller than the number of sectors defining the data portion of a frame, so all of it is written to the first frame. A portion 406 of the second user data block 408 is also written to the first frame to fill the $N_{data}$ sectors in that frame, with the ECC sectors of the first frame having ECC characters determined from the first user block and the first portion of the second user block. The remainder 410 of the second user block 408 has a size less than the data portion of a frame, so that remainder 410 is written to the second frame, together with a portion of the third user block 412. The ECC sectors of the second frame thus have ECC characters determined from the remainder 410 of the second user block 408 and a first portion of the third user block. The writing of data to the disk frames continues in this way.

The use of a fixed frame size with fixed numbers of data and ECC blocks provides an unvarying capacity for error correction because the ratio of error correction blocks to data blocks is predetermined and fixed. In removable-cartridge applications, such a fixed error-correction capacity may be undesirable because there is relatively high variability in error characteristics. In particular, disk drives used in removable-cartridge applications face generally more threats to data integrity than HDDs that are permanently installed in systems because they are exposed to greater ranges of temperature and humidity, shock and vibration, and molecular contamination as they are moved to different physical locations. In addition, disk drives used for long-term archival storage suffer from the effects of time because of magnetic thermal decay of densely recorded bits and the long-term corrosion of magnetic heads and disk media. The high areal bit densities in modern HDD designs also result in lower operating margins and increased disk-to-disk variation. These and other effects combine to create an environment in which the error characteristics of the disk medium are variable from disk to disk and change over time.

Rather than assign a predetermined capacity for error correction by using an average or worst-case evaluation, embodiments of the invention permit variability in the frame characteristics. This variability may be between different disks, with every frame on a given disk having the same frame characteristics, or may vary within a disk itself, with different frames on a given disk having different frame characteristics. In this way, a number of different conditions may be accommodated to provide an appropriate level of error correction for specific applications, making the use of the error correction both more efficient and specifically tailored for the given applications.

Figure 5:
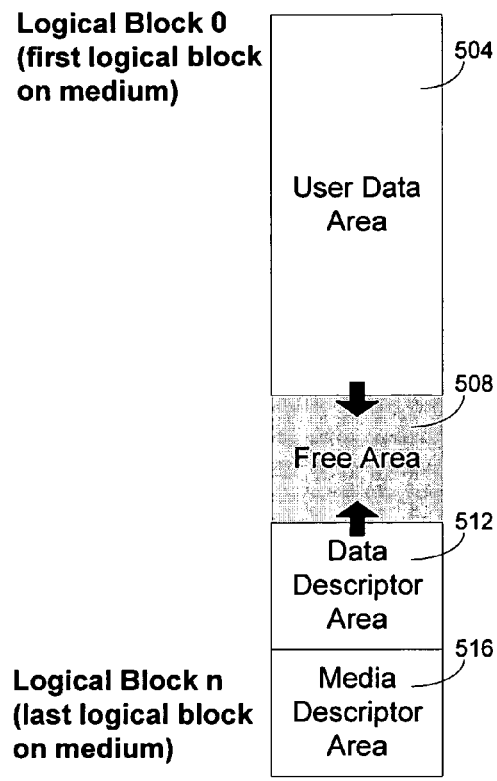
FIG. 5 illustrates a data organization used in embodiments of the invention to provide variable frame and/or ECC sizes.

In some embodiments, this variability is accommodated through use of a data organization such as illustrated in FIG. 5. In such embodiments, user data records and data delineators are not stored sequentially on the storage medium, as is commonly done for sequential data formats, but are instead stored in one of two areas: a user data area 504 is provided for the storage of user data records as logical blocks and a data descriptor area 512 is provided for the storage of data delineators, such as filemarks, setmarks, and partition markers. A media description area 516 may also be provided to contain information that describes the format of the user data area 504 and of the data descriptor area 512. In one specific embodiment, the media description area 516 is provided at one end of the storage medium, with the user data area 504 and data descriptor areas 512 being provided at opposite ends of the remaining portion of the storage medium. For instance, the user data area 504 may be provided at the beginning of the storage medium and the data descriptor area 512 provided at the end of the remaining portion of the storage medium, as illustrated specifically in FIG. 5. Each of the user data area 504 and data descriptor area 512 then grows into an intermediate free area 508. It will be appreciated that such a specific arrangement is shown for illustrative purposes and is not intended to be limiting. Equivalent physical arrangements of the areas will be evident to those of skill in the art, including, for example, interchanging the positions of the user data area 504 and data descriptor area 512, positioning the media descriptor area 516 at the beginning of the storage medium, and the like.

The user data area 504 may comprise both user data blocks and error correction blocks. Advantageously, embodiments of the invention do not impose any predetermined restriction on either the number of user data blocks or the number of error correction blocks, thereby also permitting the size of frames to be variable. The size of the user data records and the size of the error correction blocks may be determined by the sequential-access emulation system controller 102. There is thus also no constraint on the ratio of error correction blocks to user data blocks, which may vary from group to group. In addition, in some embodiments, the algorithm used to calculate the correction blocks may vary among groups, permitting the correction power of the sequential-access emulation system controller 102 to vary among groups.

In addition to storing data delineators, including filemarks, partitions, and the like, the data descriptor area 512 may store information that describes the format of the user data area 504. Examples of the type of format information that may be included in the data descriptor area 512 includes information used by the sequential-access emulation system controller 102 to perform the following functions: (1) locate each user object within the storage medium; (2) identify the size of each user record; (3) determine whether each user record is compressed or encrypted; (4) locate the last user object on the storage medium; (5) determine which blocks on the storage medium contain user data and which contain error-correction data; (6) locate each error correction group within the storage medium; and (7) identify which correction algorithm was used to calculate the error-correction blocks for each error-correction group. This functionality is achieved by storing relevant format data in the data descriptor area 512 and including programming on the sequential-access emulation system controller 102 to use that format data in implementing the functionality.

Descriptions of data objects are stored sequentially in the data descriptor area 512 as they are received from the sequential-access emulation system controller 102. The descriptions are stored as a set of descriptors, which comprise packets of information that describe one or more user objects, the location of those objects on the storage medium, and the format of those objects. The sequential-access emulation system controller 102 initiates storage of each descriptor sequentially in response to a user object transmitted by the host computer application.

The following are examples of descriptors that may be stored in the data descriptor area:

Single Record: This description contains the size (in bytes) of the next user data record on the storage medium.

|      |   |   |   | Bit |            |   |   |       |
|------|---|---|---|-----|------------|---|---|-------|
| Byte | 7 | 6 | 5 | 4   | 3          | 2 | 1 | 0     |
| 0    |   |   |   |     | Type (05h) |   |   |       |
| 1    | (LSB) |   |   |   | Record Size |   |   |       |
| 2    |   |   |   |     |            |   |   |       |
| 3    |   |   |   |     |            |   |   | (MSB) |

Repeat Record: This descriptor contains the size (in bytes) of a set of subsequent user data records that all have the same record size. It may also contain the number of user data records in the set.

|      |   |   |   | Bit |            |   |   |       |
|------|---|---|---|-----|------------|---|---|-------|
| Byte | 7 | 6 | 5 | 4   | 3          | 2 | 1 | 0     |
| 0    |   |   |   |     | Type (04h) |   |   |       |
| 1    | (LSB) |   |   |   | Record Size |   |   |       |
| 2    |   |   |   |     |            |   |   |       |
| 3    |   |   |   |     |            |   |   | (MSB) |
| 4    | (LSB) |   |   |   | Record Count |   |   |     |
| 5    |   |   |   |     |            |   |   |       |
| 6    |   |   |   |     |            |   |   |       |
| 7    |   |   |   |     |            |   |   | (MSB) |

Filemark: This descriptor specifies a set of one or more filemarks.

|      |   |   |   | Bit |            |   |   |       |
|------|---|---|---|-----|------------|---|---|-------|
| Byte | 7 | 6 | 5 | 4   | 3          | 2 | 1 | 0     |
| 0    |   |   |   |     | Type (06h) |   |   |       |
| 1    | (LSB) |   |   |   | Filemark Count |   |   |   |
| 2    |   |   |   |     |            |   |   |       |
| 3    |   |   |   |     |            |   |   | (MSB) |

Error Correction Group, Size: This descriptor indicates the number of user data blocks and error correction blocks in subsequent error corrections groups.

|      |   |   |   | Bit |            |   |   |       |
|------|---|---|---|-----|------------|---|---|-------|
| Byte | 7 | 6 | 5 | 4   | 3          | 2 | 1 | 0     |
| 0    |   |   |   |     | Type (03h) |   |   |       |
| 1    |   |   |   | Error Correction Group Size |   |   |   |   |
| 2    | (LSB) |   |   |   | User Data Group Size |   |   |   |
| 3    |   |   |   |     |            |   |   | (MSB) |

Compression Group): This descriptor indicates that user data records described by the subsequent descriptor (e.g. a single record or a repeat record) are compressed. It may also contain the size (in bytes) of the compressed size of these user data records.

| Byte | Bit 7 | 6 | 5 | 4 | 3 | 2 | 1 | 0 |
|---|---|---|---|---|---|---|---|---|
| 0 | | | | Type (07h) | | | | |
| 1 | (LSB) | | | Compressed Size | | | | |
| 2 | | | | | | | | |
| 3 | | | | | | | | (MSB) |

Encryption Group: This descriptor indicates that the user data records described by the subsequent descriptor (e.g. a single record or a repeat record) are encrypted. It may also contain the size (in bytes) of the encrypted size of these user data records.

| Byte | Bit 7 | 6 | 5 | 4 | 3 | 2 | 1 | 0 |
|---|---|---|---|---|---|---|---|---|
| 0 | | | | Type (08h) | | | | |
| 1 | (LSB) | | | Encrypted Size | | | | |
| 2 | | | | | | | | |
| 3 | | | | | | | | (MSB) |

Encryption/Compression Group: This descriptor indicates that the user data records described by the subsequent descriptor (e.g. a single record or a repeat record) are both encrypted and compressed. It may also contain the size (in bytes) of the encrypted and compressed size of these user data records.

| Byte | Bit 7 | 6 | 5 | 4 | 3 | 2 | 1 | 0 |
|---|---|---|---|---|---|---|---|---|
| 0 | | | | Type (09h) | | | | |
| 1 | (LSB) | | | Compressed/Encrypted Size | | | | |
| 2 | | | | | | | | |
| 3 | | | | | | | | (MSB) |

Position: This descriptor describes a set of user data records on the storage medium and may include one or more of the following: (1) the size of the error correction group used to store the subsequent set of user data records; (2) the number of filemarks that precede the set of user data records; (3) the number of user data records that precede this set of used data records; (4) the location of the storage-medium block that contains the first byte of the first user data record of this set; (5) the position of the user data block described by the location of the storage-medium block within the error-correction group; and (6) the byte offset within the position of the user data block of the first byte of the first user data record of this set.

| Byte | Bit 7 | 6 | 5 | 4 | 3 | 2 | 1 | 0 |
|---|---|---|---|---|---|---|---|---|
| 0 | | | | Type (02h) | | | | |
| 1 | | | | Error Correction Group Size | | | | |
| 2 | (LSB) | | | User Data Group Size | | | | |
| 3 | | | | | | | | (MSB) |
| 4 | (LSB) | | | FM Count | | | | |

-continued

| Byte | Bit 7 | 6 | 5 | 4 | 3 | 2 | 1 | 0 |
|---|---|---|---|---|---|---|---|---|
| 5 | | | | | | | | |
| 6 | | | | | | | | |
| 7 | | | | | | | | (MSB) |
| 8 | (LSB) | | | Host Logical Record Number | | | | |
| 9 | | | | | | | | |
| 10 | | | | | | | | |
| 11 | | | | | | | | (MSB) |
| 12 | (LSB) | | | Disk Logical Block Address | | | | |
| 13 | | | | | | | | |
| 14 | | | | | | | | |
| 15 | | | | | | | | (MSB) |
| 16 | (LSB) | | | Error Correction Group Offset | | | | |
| 17 | | | | | | | | (MSB) |
| 18 | (LSB) | | | Byte Offset | | | | |
| 19 | | | | | | | | (MSB) |

End of Data: The location of this descriptor within the data descriptor area 512 indicates the position of the last user object recorded on the storage medium.

| Byte | Bit 7 | 6 | 5 | 4 | 3 | 2 | 1 | 0 |
|---|---|---|---|---|---|---|---|---|
| 0 | | | | Type (00h) | | | | |
| 1 | | | | Pad (000000h) | | | | |
| 2 | | | | | | | | |
| 3 | | | | | | | | |

Archival Sense Field: This descriptor indicates that the next set of sectors is an archival sense field ("ASF") as described in detail in §3 below.

| Byte | Bit 7 | 6 | 5 | 4 | 3 | 2 | 1 | 0 |
|---|---|---|---|---|---|---|---|---|
| 0 | | | | Type (0Ah) | | | | |
| 1 | (LSB) | | | Archival Sense Field Size | | | | |
| 2 | | | | | | | | |
| 3 | | | | | | | | (MSB) |

Other types of data descriptors may also be stored in the data descriptor area 512 in alternative embodiments. It will be evident that the data descriptor structure described above uses low overhead for user data records of a fixed size. Each group of equally sized records only generates an eight-byte descriptor in the form of the repeat record, independent of the correction group size. Such a repeat record descriptor type thus allows for efficient storage of redundant descriptor information—multiple records of the same size are described by only one data descriptor. The format is generally more efficient than inline header formats that require at least one set of header information per user data block because a single descriptor can describe multiple fixed-size user data records and correction groups. The format is also more efficient than such inline header formats because the filemarks do not take up user data space on the storage medium.

On termination conditions, the sequential-access emulation system controller 102 does not need to add fill data to the current correction group size. Instead, it might only fill to a storage-medium block boundary. The sequential-access emulation system controller 102 may implicitly determine these conditions when reading the storage medium using the data descriptor information. This is in contrast to inline header formats that typically require all correction groups to be of the same size. The electronic hardware for implementing this format is also advantageously simpler than for an inline header format because no data-descriptor metadata needs to be inserted in the user data stream; the data descriptors are stored in a separate portion of the medium. Searching to an arbitrary position in the storage medium may proceed more quickly because the absolute position of the target object can be determined from the data descriptor information. This is in contrast to inline header formats, which typically store coarse-grained position information in a directory structure that is used to get close to the target and then sequentially read to the target.

The format also generally makes it possible to support variable correction-group sizes across the storage medium because there is no intrinsic reliance on consistency of correction-group size. The current correction-group size is instead indicated by the data descriptor information. It is noted that the use of variable error-correction groups advantageously removes the need to pad the error correction group to the end of the group boundary at termination conditions such as a flush, which occurs after various commands are received, one example of which is a write command in an unbuffered mode. The capacity of the storage medium is effectively increased since there is no padding at append boundaries.

The media descriptor area 516 contains information that describes the format of the data descriptor area 512 and of the user data area 504. The sequential-access emulation system controller 102 uses the information in the media descriptor area 516 to decode or format the fields of one or both of the user data area 504 and data descriptor area 512. The media descriptor area 516 may advantageously be prewritten at the time of manufacture of the removable storage-medium cartridge.

Merely by way of example, the media descriptor area 516 may comprise an initial value for the error-correction group size to be used when writing the first user data record to the user data area 504. While the error-correction group size may vary from group to group, this provides a convenient way to provide an initial value to the sequential-access emulation system controller 102. Storing the initial value in on the storage medium as part of the media descriptor area 516 advantageously permits the size of the first error-correction group to vary from storage device to storage device in a manner that accounts for data-reliability characteristics of a particular make and model of storage device. Such a feature allows a manufacturer of the removable storage-medium cartridge to program each cartridge with a different starting value for the group size, reflecting the uniqueness of the characteristics that may affect its data reliability. For instance, a manufacturer may produce some cartridges based on storage devices with a native error rate of $10^{-14}$ while producing other cartridges based on storage devices with a native error rate of $10^{-13}$. The storage device with the higher native error rate may require more ECC overhead to achieve the desired data reliability for the cartridge. Since the starting value of the group size is programmed in the cartridge in this way, the sequential-access emulation system controller 102 can apply the desired level of ECC without prior knowledge of differences between the storage devices. It is noted that the ability to include this functionality is a consequence of the adaptive nature of the format described above.

Figure 6:
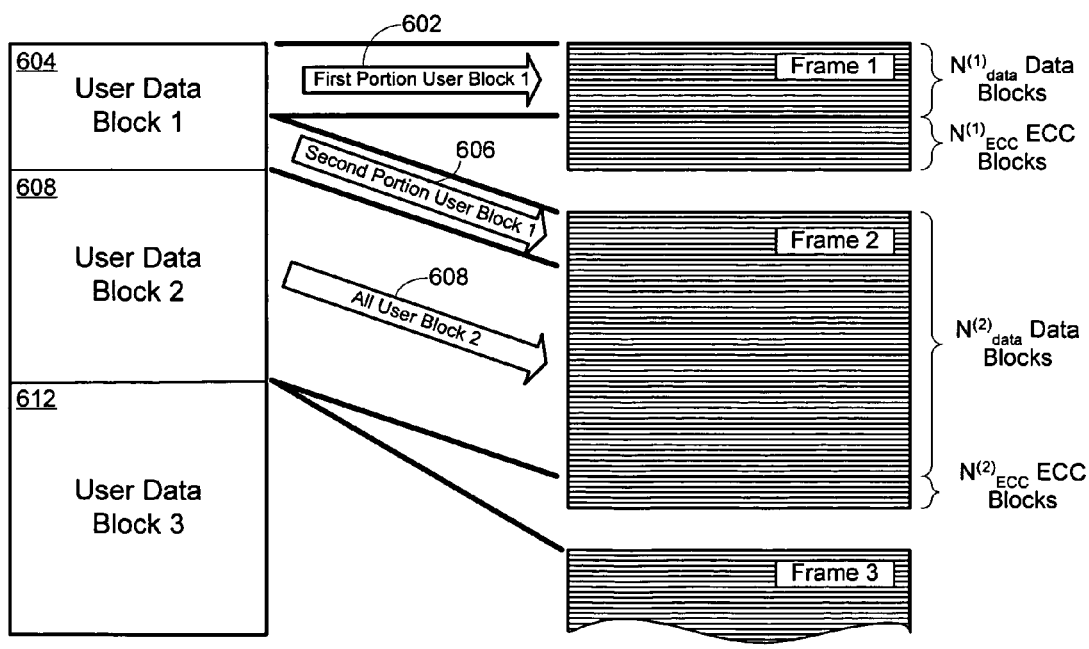
FIG. 6 illustrates a mapping of user data to the HDD when using the data organization illustrated in FIG. 5.

The variability that derives from this format permits a mapping of user data blocks as indicated in FIG. 6, which may be compared with the mapping previously described in connection with FIG. 4. The variability in frame size and in the distribution of data blocks and ECC blocks within each frame is indicated in the drawing by generally different values of $N_{data}$ and $N_{ECC}$ for different frames, the notation being generalized to provide a superscript identifying the individual frames $N_{data}^{(frame)}$ and $N_{ECC}^{(frame)}$. As was the case in describing FIG. 4, the user data blocks may be of variable size, but the variability of the frame sizes need not match the variability in user data blocks. Thus, for example, FIG. 6 shows that only a first portion 602 of the first user data block 604 is mapped to the first frame because the frame has a smaller user data area 504 than the first user data block 604. The remainder 606 of the first user block 604 is mapped to the second frame, together with the entirety of the second user data block 608, reflecting the fact that the second frame has a greater number of data blocks than the first frame. The process continues with the third user data block 612 and subsequent user data blocks. The error-correction capability of the first frame is considerably greater than that of the second frame—the larger number of ECC blocks and smaller number of data blocks for first frame as compared with the second frame both increase the ratio of error-correction blocks to data blocks.

While FIG. 6 provides an illustration in which frames are physically separate on the storage medium, this is not a requirement. In certain alternative embodiments, blocks comprised by the frames may be interleaved, with the interleaving being performed for any groups of two or more frames. For example, some frames might be provided as physically separate, some pairs of frames might be interleaved, and/or some larger groups of frames may be interleaved in various embodiments.

3. Archival Sense Field

Evaluation of a desired level of error-correction capability may be performed in some embodiments with an archival sense field. Use of such an archival sense field is described briefly herein, with further details available in copending, commonly assigned U.S. Prov. Pat. Appl. No. 60/617,124, entitled "ARCHIVAL DATA FORMAT FOR REMOVABLE DISK CARTRIDGE," filed Oct. 7, 2004 by Steven P. Georgis, the entire disclosure of which is incorporated herein by reference for all purposes.

The ASF may be used to diagnose data reliability, such as may be reflected by media aging and time-related degradation of data. The ASF is recorded as a sequence of one or more sectors containing a special data pattern. In some embodiments, the ASF is recorded over a relatively large number of sectors, such as over 100 sectors. The ASF pattern is designed to reflect the degree of data degradation, such as may result from magnetic degradation, of the recorded data bits on the storage medium when read back. The data pattern in the ASF may sometimes advantageously be designed to correspond to a worst-case pattern from the perspective of signal-to-noise ratio, magnetic thermal decay, and corrosion of the magnetic heads and media; these are examples of physical phenomena that can cause recorded data to become unrecoverable over time. In one embodiment, the ASF is recorded in the normal part of the storage medium using LBAs and consequently degrades similarly to the user data recorded elsewhere on the storage medium.

The ASF is preferably designed to degrade more quickly than at least some of the other data on the storage medium. This may be achieved, for example, by writing the ASF with a lower magnetic field than is normally used for writing data. The ASF could alternatively be written to a portion of the storage medium known to have an increased risk of failure. In some instances, error correction could be avoided for the ASF so that any error-correction circuits of the storage medium would not mask degradation of the ASF. In some drives, reading the magnetic signal can also cause degradation of that signal; thus, in some embodiments, the ASF could be read more than other portions of the storage medium to increase the likelihood of identifying detrimental effects on the ASF first.

Figure 7:
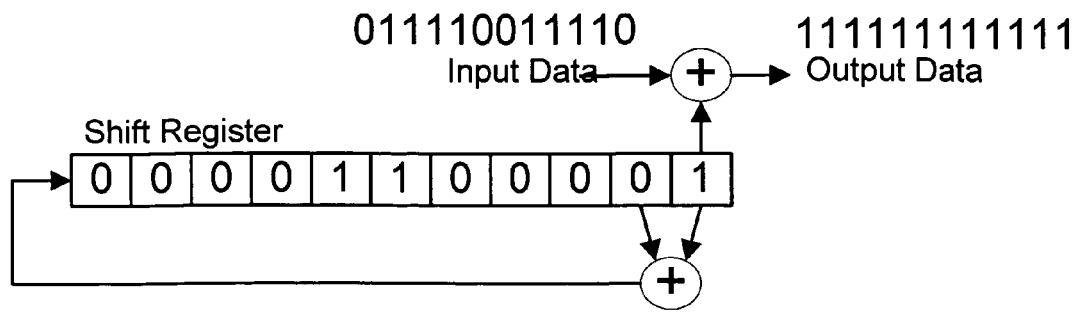
FIG. 7 illustrates a data-randomizer circuit used by an HDD to randomize data.

Data-randomizing circuits are used with random-access storage media to minimize extended sequences of worst-case magnetic patterns. FIG. 7 illustrates a "de-randomized" worst-case pattern that is determined mathematically by operating the data-randomizing algorithm in reverse. Alternatively, a known worst-case pattern could be used in some embodiments. The repeated worst-case bit patterns in the ASF will likely degrade more rapidly than normal random data on the storage medium, thereby predicting when the data portions of the storage medium are at risk.

The sensing operation may be performed by the sequential-access emulation system controller 102 reading the ASF while monitoring the bit error rate ("BER") and ECC functions in the internal storage-medium circuits. The BER and ECC indicators are examples of data-reliability indicators, which may be used by the sequential-access emulation system controller 102 to determine an inherent level of data reliability of the particular storage medium and heads. Such data-reliability indicators are used as feedback to the variable format to establish an ECC level for the user data area 504. Small error-correction capability may be appropriate, reflected by the use of relatively fewer ECC blocks, when the data-reliability indicators show that the storage medium is operating at relatively high levels. If the data-reliability indicators instead measure degraded performance, the level of error-correction capability may be greater by using relatively more ECC blocks in the variable format. In different embodiments, such a sensing operation may be performed one time at the beginning of a write operation, or may alternatively be performed at periodic intervals during a write operation to provide continued adjustment of error-correction capability to suit the media conditions.

4. Data Storage

Figure 8:
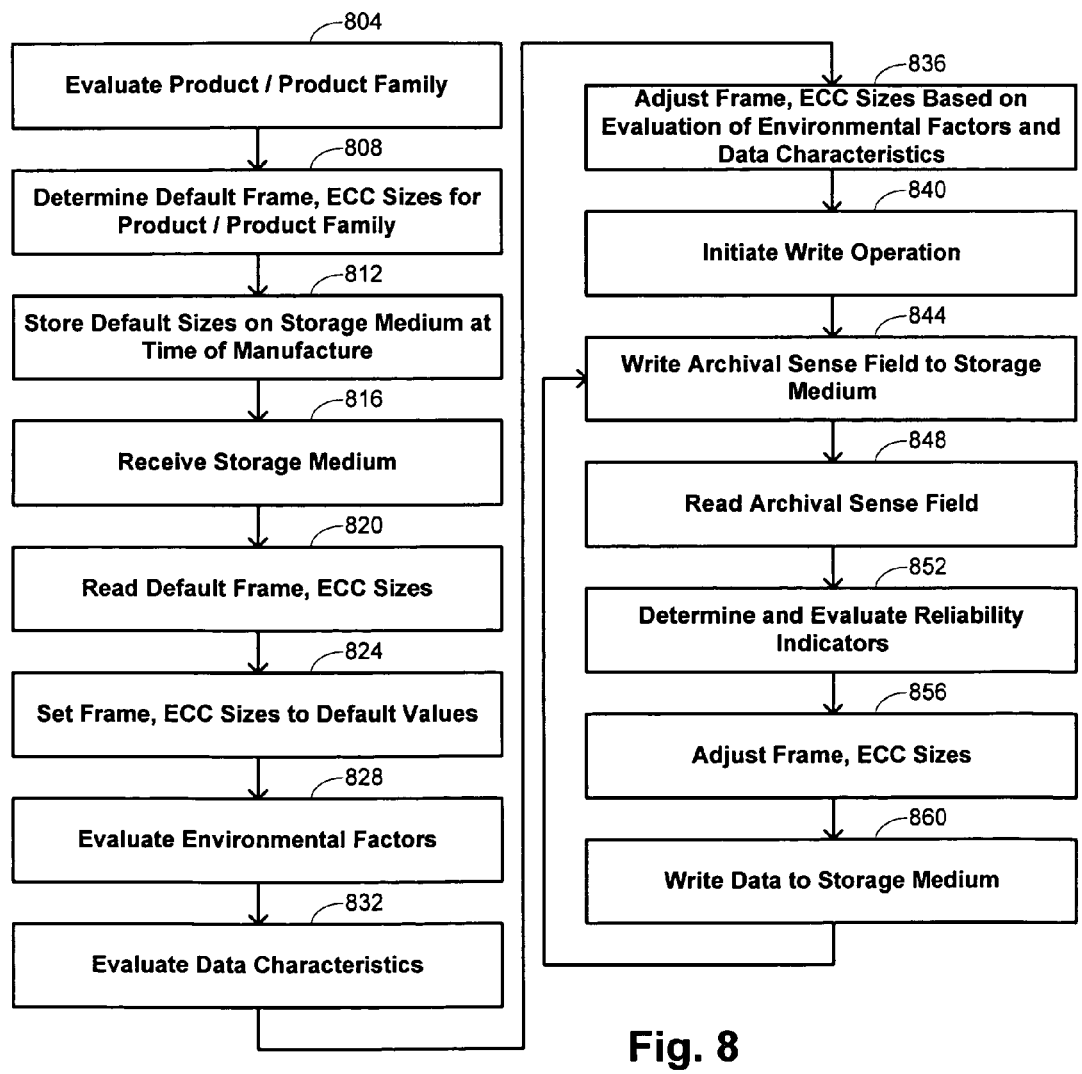
FIG. 8 is a flow diagram illustrating methods for storing data on an HDD according to embodiments of the invention.

A summary is provided in FIG. 8 of methods for storing data on a random-access storage medium according to embodiments of the invention. This summary reflects both manufacturer-level processes that may be performed when the storage medium is manufactured, as well as user-level processes when storage data are written to the storage medium. Processes at both levels make use of the variability of the format described above.

At block 804, a manufacturer performs an evaluation of a product or series of products that comprise random-access storage media. Such an evaluation examines physical characteristics of the medium to determine a default level of error correction suitable for the product or product family. This evaluation acknowledges that there may be systematic physical characteristics of products that results in their having different intrinsic levels of reliability. Determination of the default level is translated into a determination of default frame and ECC sizes for the product or product family at block 808. These default sizes are recorded on the storage medium at the time of its manufacture at block 812, such as by writing the default values to the media descriptor area 516. For instance, in a specific embodiment, the manufacturer may determine that a suitable default frame should comprise 128 user data blocks and 4 error-correction blocks.

The storage medium that is received by a user at block 816 thus includes a default specification of frame and ECC sizes that correspond to a manufacturer's determination of its intrinsic reliability. The default specification is read by the sequential-access emulation system controller 102 at block 820 so that the frame and ECC block sizes may be set to the default values at block 824. These default values may be modified by an evaluation by the sequential-access emulation system controller 102 of environmental factors and of data characteristics at blocks 828 and 832 respectively. Examples of environmental factors that may result in an adjustment of the default values include BER information returned from the storage device, spin-up time of the storage device, servo performance information returned from the storage device, temperature where the storage device is to reside, the age of the storage device, diagnostic data retrieved from the storage device, and the like. Evaluation of the data characteristics at block 832 may indicate such factors as an enhanced need for data integrity because of importance of the data, reflected by an increase in the relative number of ECC blocks to be assigned. Adjustment of the frame and ECC sizes based on such evaluations is performed at block 836 so that write operations may be initiated based on the adjusted frame and ECC sizes at block 840. For instance, the default 128 user data blocks and 4 error-correction blocks might be modified to be 64 user data blocks and 8 error-correction blocks because environmental conditions are volatile and the data to be written are deemed sensitive. This information is stored in the data descriptor area.

The process may be iterative, with the frame and ECC sizes being adjusted periodically. One convenient way of implementing such periodic adjustment is performed by writing an ASF to the storage medium at block 844 and immediately reading the ASF that was just written at block 848 to determine and evaluate reliability indicators at block 852. The frame and ECC sizes may be adjusted at block 856 to accommodate the actual reliability determined from the ASF, with the new frame and ECC sizes being applied when writing subsequent data to the storage medium at block 860. For instance, the ASF evaluation may show that the storage medium is unusually resistant to data corruption so that the 64 user data blocks and 8 error-correction blocks are modified to be 96 user data blocks and 6 error-correction blocks. This information is stored in the data descriptor area. This modification of frame and error-correction block sizes may proceed repeatedly until all the data have been written to the storage medium.

Thus, having described several embodiments, it will be recognized by those of skill in the art that various modifications, alternative constructions, and equivalents may be used without departing from the spirit of the invention. For example, while the description has focused on the use of a sequential-access emulation system controller 102, alternative embodiments may advantageously use the format structure and error-correction capabilities in a system that uses a random-access emulation system controller. Such a random-access emulation system controller could, for instance, emulate a hard-disk drive with a random-access format. This would provide the flexibility of the error-correction capabilities and other advantages discussed above to random-access systems. One difference between sequential-access and random-access formats is that the user data blocks, such as illustrated in FIG. 6, are typically of fixed size in random-access formats, with data being identified according to a specified address.

Accordingly, the above description should not be taken as limiting the scope of the invention, which is defined in the following claims.

What is claimed is:

1. A method of storing data on a random-access storage medium, the method comprising:
   receiving a user set of data;
   mapping the user set of data to a plurality of frames;
   for each frame,
      generating error-correction bytes over the data mapped to such each frame;
      writing the data mapped to such each frame to a number of data blocks comprised by such each frame; and
      writing the error-correction bytes generated for such each frame to a number of error-correction blocks comprised by such each frame,
   wherein at least one of the number of error-correction blocks and the number of data blocks differs among at least some of the frames.

2. The method recited in claim 1 further comprising determining the number of error-correction blocks comprised by at least one of the frames from an evaluation of environmental conditions for the random-access storage medium.

3. The method recited in claim 2 wherein the environmental conditions comprise a condition selected from the group consisting of bit-error-rate information returned from the storage medium, spin-up time of the storage medium, servo performance indicators, temperature of an environment where the storage medium is to reside, age of the storage medium, and diagnostic information retrieved from the storage medium.

4. The method recited in claim 1 further comprising:
   writing an archival sense field to the random-access storage medium, the archival sense field comprising a data pattern sensitive to data degradation;
   reading the archival sense field from the random-access storage medium to evaluate a data-reliability indicator; and
   determining the number of error-correction blocks comprised by at least one of the frames from the evaluation of the data-reliability indicator.

5. The method recited in claim 4 wherein the data-reliability indicator comprises a bit error rate.

6. The method recited in claim 1 further comprising:
   reading a default number of error-correction blocks from the random-access storage medium; and
   determining the number of error-correction blocks comprised by at least one of the frames by modifying the default number of error-correction blocks in accordance with an evaluation of environmental conditions for the random-access storage medium.

7. The method recited in claim 1 further comprising:
   reading a default number of error-correction blocks from the random-access storage medium;
   writing an archival sense field to the random-access storage medium, the archival sense field comprising a data pattern sensitive to data degradation;
   reading the archival sense field from the random-access storage medium to evaluate a data-reliability indicator; and
   determining the number of error-correction blocks comprised by at least one of the frames by modifying the default number of error-correction blocks in accordance with the evaluation of the data-reliability indicator.

8. The method recited in claim 1 wherein the random-access storage medium comprises a hard disk drive.

9. The method recited in claim 1 wherein receiving the user set of data comprises receiving the user set of data from a sequential-access emulation system controller adapted to interface with a host computer using a set of commands applicable to a sequential-access storage device.

10. The method recited in claim 9 wherein the sequential access storage device comprises a tape drive.

11. The method recited in claim 1 wherein receiving the user set of data comprises receiving the user set of data from a random-access emulation system controller adapted to interface with a host computer using a set of commands applicable to a random-access storage device.

12. The method recited in claim 1 wherein at least some of the frames are interleaved.

13. A method of storing data on a random-access storage medium, the method comprising:
   receiving a user set of data to be written to the random-access storage medium in a plurality of frames, each such frame having a number of data blocks assigned to store data and a number of error-correction blocks assigned to hold error-correction bytes generated for the data stored in the data blocks of the each such frame;
   reading a default specification of the number of data blocks and the number of error-correction blocks from the random-access storage medium; and
   writing the data to the plurality of frames, wherein writing the data comprises generating the error-correction bytes for each frame and writing the error-correction bytes to the plurality of frames,
   wherein the number of data blocks and the number of error-correction blocks for each of the frames is determined from the default specification.

14. The method recited in claim 13 further comprising determining the number of data blocks and the number of error-correction blocks for at least one of the frames by modifying the default specification in accordance with an evaluation of environmental conditions for the random-access storage medium.

15. The method recited in claim 13 further comprising:
   writing an archival sense field to the random-access storage medium, the archival sense field comprising a data pattern sensitive to data degradation;
   reading the archival sense field from the random-access storage medium to evaluate a data-reliability indicator; and
   determining the number of data blocks and the number of error-correction blocks for at least one of the frames by modifying the default specification in accordance with the evaluation of the data-reliability indicator.

16. The method recited in claim 15 wherein the data-reliability indicator comprises a bit error rate.

17. The method recited in claim 13 wherein receiving the user set of data comprises receiving the user set of data from a sequential-access emulation system controller adapted to interface with a host computer using a set of commands applicable to a sequential-access storage device.

18. The method recited in claim 13 wherein receiving the user set of data comprises receiving the user set of data from a random-access emulation system controller adapted to interface with a host computer using a set of commands applicable to a random-access storage device.

19. A data-storage system comprising:
   a random-access storage medium;
   an emulation system controller coupled with the random-access storage medium and adapted to interface with a host computer, wherein the emulation system controller has programming instructions to write a set of user data to the random-access storage medium, the programming instructions comprising:
instructions for receiving the user set of data;
instructions for mapping the user set of data to a plurality of frames;
instructions for generating error-correction bytes for each from over the data mapped to such each frame;
instructions for writing the data mapped to such each frame to a number of data blocks comprised by such each frame; and
instructions for writing the error-correction bytes generated for such each frame to a number of error-correction blocks comprised by such each frame,
wherein at least one of the number of error-correction blocks and the number of data blocks differs among at least some of the frames.

20. The data-storage system recited in claim 19 wherein the emulation system controller comprises a sequential-access emulation system controller adapted to interface with the host computer using a set of commands applicable to a sequential-access storage device.

21. The data-storage system recited in claim 19 wherein the emulation system controller comprises a random-access emulation system controller adapted to interface with the host computer using a set of commands applicable to a random-access storage device.

22. The data-storage system recited in claim 19 wherein the programming instructions further comprise instructions for determining the number of error-correction blocks comprised by at least one of the frames from an evaluation of environmental conditions for the random-access storage medium.

23. The data-storage system recited in claim 22 wherein the environmental conditions comprise a condition selected from the group consisting of bit-error-rate information returned from the storage medium, spin-up time of the storage medium, servo performance indicators, temperature of an environment where the storage medium is to reside, age of the storage medium, and diagnostic information retrieved from the storage medium.

24. The data-storage system recited in claim 19 wherein the programming instructions further comprise:
instructions for writing an archival sense field to the random-access storage medium, the archival sense field comprising a data pattern sensitive to data degradation;
instructions for reading the archival sense field from the random-access storage medium to evaluate a data-reliability indicator; and
instructions for determining the number of error-correction blocks comprised by at least one of the frames from the evaluation of the data-reliability indicator.

25. The data-storage system recited in claim 19 wherein the programming instructions further comprise:
instructions for reading a default number of error-correction blocks from the random-access storage medium; and
instructions for determining the number of error-correction blocks comprised by at least one of the frames by modifying the default number of error-correction blocks in accordance with an evaluation of environmental conditions for the random-access storage medium.

* * * * *